(12) United States Patent
Hanaoka et al.

(10) Patent No.: US 8,319,999 B2
(45) Date of Patent: Nov. 27, 2012

(54) METHOD AND APPARATUS FOR PRINTING A LOCKED PRINT JOB

(75) Inventors: Nobutaka Hanaoka, Pinebrook, NJ (US); Jayasimha Nuggehalli, Cupertino, CA (US)

(73) Assignees: Ricoh Company, Ltd., Tokyo (JP); Ricoh Americas Corporation, Cupertino, CA (US)

( * ) Notice: Subject to any disclaimer, the term of this patent is extended or adjusted under 35 U.S.C. 154(b) by 885 days.

(21) Appl. No.: 12/388,238

(22) Filed: Feb. 18, 2009

(65) Prior Publication Data

US 2010/0208287 A1    Aug. 19, 2010

(51) Int. Cl.
G06F 3/12       (2006.01)
G06F 7/04       (2006.01)
G06K 15/00      (2006.01)
H04N 1/00       (2006.01)
H04N 7/16       (2011.01)

(52) U.S. Cl. ...... 358/1.15; 358/1.14; 358/402; 358/403; 726/4; 726/26; 340/5.8

(58) Field of Classification Search .................. None
See application file for complete search history.

(56) References Cited

U.S. PATENT DOCUMENTS

2007/0008581 A1 * 1/2007 Han .......................... 358/1.15

FOREIGN PATENT DOCUMENTS

WO        WO 0068817 A1 * 11/2000

OTHER PUBLICATIONS

U.S. Appl. No. 12/465,669, filed May 14, 2009, Nuggehalli, et al.

* cited by examiner

*Primary Examiner* — Thomas Lett
(74) *Attorney, Agent, or Firm* — Oblon, Spivak, McClelland, Maier & Neustadt, L.L.P.

(57) ABSTRACT

A method, apparatus, and system for outputting a locked print job by a printing device connected to a first terminal and a second terminal over a network. The method includes receiving a request including information identifying a second user delegated to the locked print job, to perform the locked print job from a first user, and generating the locked print job in response to the request. The locked print job and the information identifying the second user is transmitted to the printing device over the network. The printing device stores the locked print job, the information identifying the second user, and authentication information that unlocks the locked print job when entered into the printing device and is transmitted to the second terminal associated with the second user. Further, the locked print job is output by the printing device, when the authentication information is entered into the printing device.

13 Claims, 19 Drawing Sheets

Locked Print Details — 1060

User ID: [ ] — 1062

Password: [ ] — 1064

[ ] Delegate to Executive Assistant — 1066    [ Details ] — 1068

[ OK ]    [ Cancel ]    [ Help ]

Figure 10C

Locked Print Delegation Details — 1080

Executive assistant Email ID: [ ] — 1082

Special Instructions: [ ] — 1084

[ OK ]    [ Cancel ]    [ Help ]

Figure 10D

```
@PFL COMMENT EXECUTIVE ASSISTANT EMAIL EASSISTANT@COMPANY.COM
@PFL COMMENT EXECUTIVE ASSISTANT INSTRUCTIONS PRINT FOR 2PM MEETING
@PJL SET USERID="EASSISTANT"                    [Example]
@PJL SET JOBPASSWORD3="AUkxcAAARWFizJw"         [Encrypted password]
```

METHOD AND APPARATUS FOR PRINTING A LOCKED PRINT JOB

BACKGROUND OF THE INVENTION

1. Field of the Invention

The present invention relates generally to printing a locked print job. The present invention is more particularly related to delegating the locked print job to another user.

2. Description of the Related Art

In environments such as an office or computer lab, computers may be connected to one or more printers shared over a network. To print a document, a computer user typically transmits a request to print the document to one of the shared printers. The shared printer prints the document, in response to the print request, and the computer user retrieves the printed document from the shared printer.

However, in such environments, it is difficult to maintain confidentiality of the printed document. For example, it is difficult to prevent other users from viewing the printed document between the time the document is printed by the printer and when the printed document is retrieved by the computer user.

Accordingly, a printing device may be configured to require that a password be entered, before the printing device permits the document to be printed. FIG. 13 illustrates an approach for implementing locked printing on a printing device, as disclosed in U.S. Pat. No. 7,249,900. As illustrated in FIG. 13, locked printing is initiated by a user at a client device in step S1302. The user specifies a user ID and password data corresponding to the locked printing. Next, print data is generated and transmitted to the printing device in steps S1304 and S1306, respectively. In the printing device, the print data is processed by a locked print process in step S1308, and stored on the printing device if locked printing is specified in step S1310. Then, the user accesses the printing device and selects the locked printing option in step S1312. The user selects the user ID and enters the corresponding password data in step S1314. When the password data is authenticated in step S1316, a list of print data associated with the authenticated user ID/password pair is presented in step S1318. The user may select one of or more of the listed print data and perform an action (e.g., print or delete) in step S1320.

However, since the user ID and corresponding password data are required to act on the print data, only the user who specifies the user ID and password data can unlock the print request and retrieve the printed document from the printing device. Thus, the user cannot conveniently delegate the printing to another user, such as an assistant.

SUMMARY OF THE INVENTION

According to an embodiment of the present invention, a method is provided for outputting a locked print job by a printing device connected to a first terminal and a second terminal over a network. The method includes receiving, in the first terminal, a request to perform the locked print job from a first user. The request includes information identifying a second user delegated to the locked print job. The locked print job is generated, by the first terminal, in response to the request. Further, the first terminal transmits the locked print job and the information identifying the second user to the printing device over the network. The printing device receives the locked print job and the information identifying the second user transmitted by the first terminal, and stores the locked print job, the information identifying the second user, and authentication information. The authentication information is configured to unlock the locked print job when entered into the printing device. The method further includes transmitting the authentication information to the second terminal associated with the second user, and outputting, by the printing device, the locked print job, when the authentication information is entered into the printing device.

Further, according to another embodiment of the present invention, there is provided a method for a printing device to service a request to perform a locked print job from a first user. The method includes receiving the locked print job and information identifying a second user delegated to the locked print job from a first terminal. The locked print job, the information identifying the second user, and authentication information, are stored in a memory. The authentication information is configured to unlock the locked print job when entered into the printing device. Further, the locked print job is outputted, when the authentication information is inputted into the printing device.

According to another embodiment of the invention, there is provided a printing device. The printing device includes means for receiving the locked print job and information identifying a second user delegated to the locked print job from a first terminal; means for storing, in memory, the locked print job, the information identifying the second user, and authentication information, the authentication information being configured to unlock the locked print job when entered into the printing device; and means for outputting the locked print job, when the authentication information is inputted into the printing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10A-10D are screenshots of exemplary interfaces that may be used to set up the delegated locked print job request using the client device;

FIG. 11 illustrates exemplary PJL commands/comments that are used when a the locked print job is to be delegated to another user;

FIGS. 12A-12C are screenshots of exemplary interfaces for allowing a user to unlock the locked print job in the printing device.

DETAILED DESCRIPTION OF THE PREFERRED EMBODIMENTS

Figure 1:
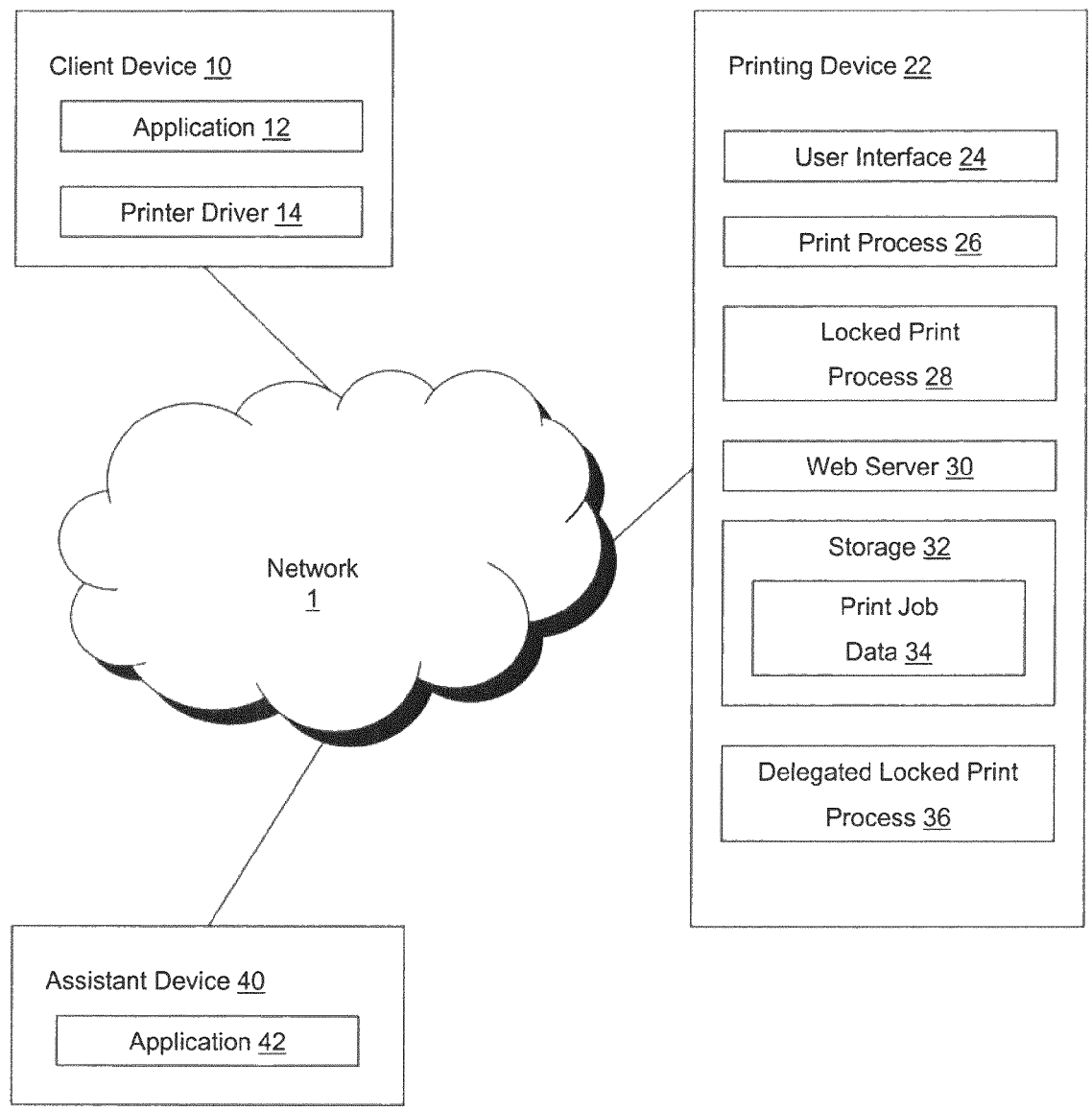
FIG. 1 illustrates an exemplary network structure including a client device, printing device, and assistant device connected over a network.

Referring now to the drawings, wherein like reference numerals designate identical or corresponding parts throughout the several views, FIG. 1 is a block diagram that shows an arrangement for implementing a delegated locked printing on a printing device according to one embodiment of the invention.

As illustrated in FIG. 1, a client device 10, printing device 22, and assistant device 40 are connected to each other over a network 1, such as a Local Area Network (LAN), Wide Area Network (WAN), or Wireless Local Area Network (WLAN). It is noted that the client device 10, printing device 22, and assistant device 40 need not be connected to each other over the same network. For example, the client device 10 may be connected to the printing device 22 over a first communication path (e.g., the Internet, a LAN, or mobile network), and the client device 10 or the printing device 22 may be connected to the assistant device 40 over a second communication path that is different from the first communication path.

The client device 10 may include an application 12 and printer driver 14. Application 12 may be any type of application executed on the client device 10. The application 12 may include one or a combination of, for example, a word processing application, spreadsheet application, e-mail client, web browser, portable document format (PDF) viewer, image viewing/editing software, or any other application configured to generate data for processing by the printing device 22. The printer driver 14 is configured to provide a user interface to set up the delegated locked printing, as further discussed below. Further the printer driver 14 is configured to process the data from the application 12 and generate print data that is provided to the printing device 22 for processing.

Figure 10A:
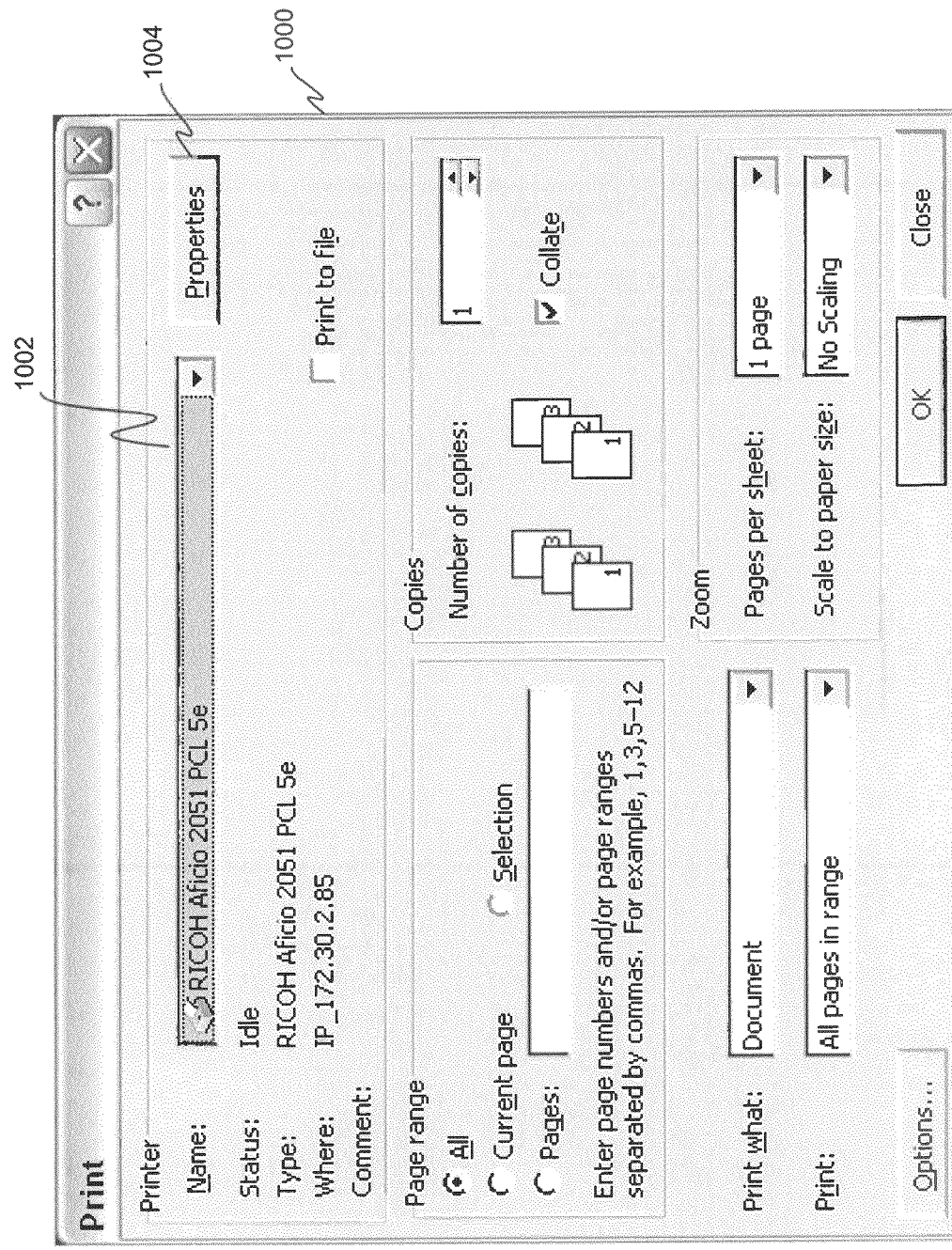
Figure 10B:
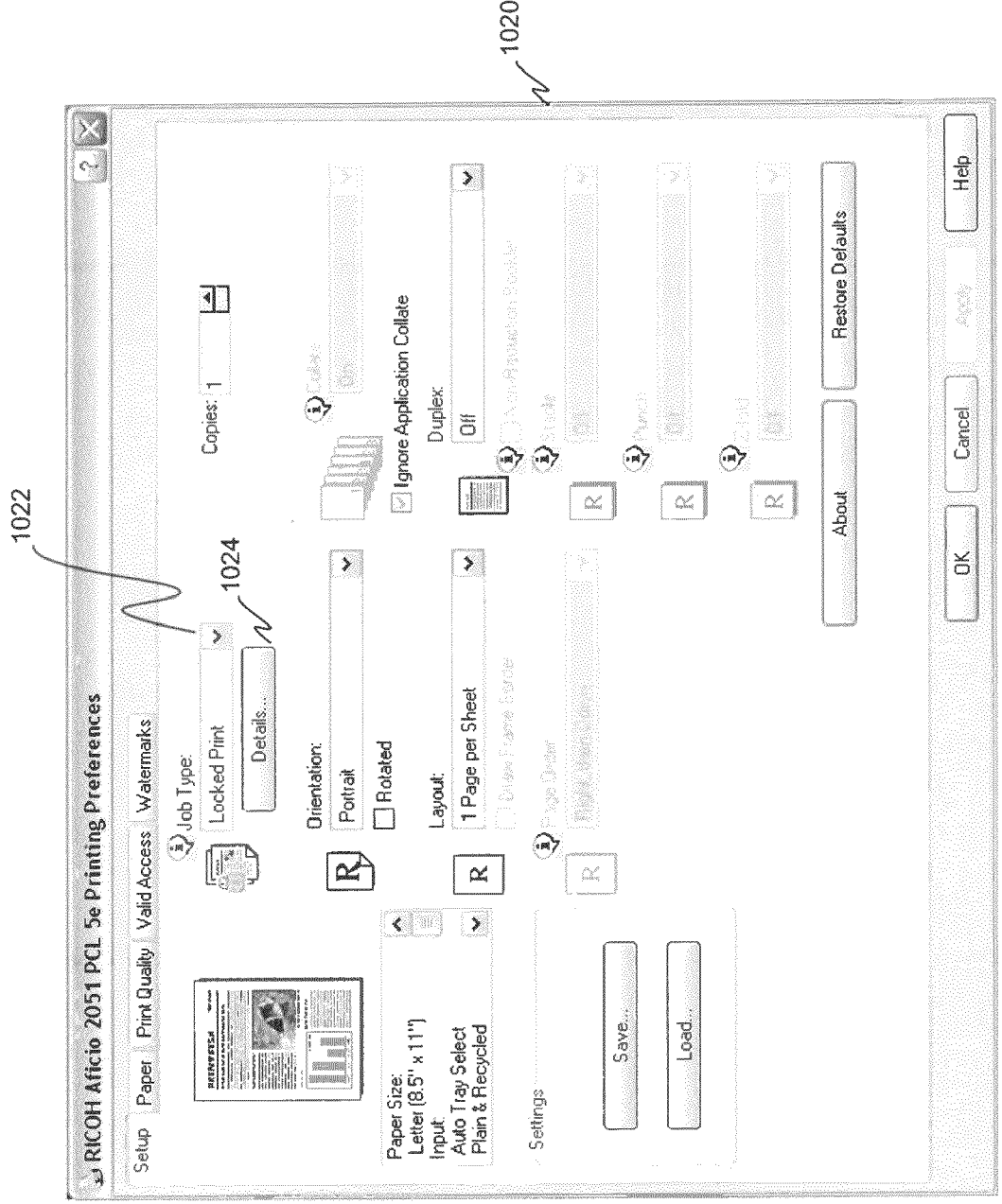

The client device 10 may display user interfaces such as those illustrated in FIGS. 10A-10D. For example, in FIG. 10A, a print window 1000 is displayed to a user of the client device 10. The user selects a printer to process a print job in a drop down window 1002. If the user selects the properties button 1004, a printing preferences window 1020, as illustrated in FIG. 10B, is displayed that allows the user to define whether the type of the print job corresponds to a locked or unlocked printing in a drop down window 1022. For the locked printing, the user may define further details, by selecting the details button 1024. In response, a locked print details window 1060 is displayed, providing fields for the user to enter a user ID and password to be associated with the print job, as illustrated in FIG. 10C.

The locked print details window further includes a "Delegate to Executive Assistant" option 1066 to delegate the locked printing to another user. In one embodiment, when the "Delegate to Executive Assistant" option 1066 is checked, the user is prevented from editing the user ID and password fields, and the user ID and password is automatically generated by the client device 10. Alternatively, the user may be permitted to manually enter the user ID and password.

The user may further define parameters of the delegated locked printing by selecting details button 1068. The client device displays a locked printing delegation details window 1080, illustrated in FIG. 10D, when the details button 1068 is selected by the user. In the locked printing delegation details window 1080, the user may enter information identifying another user that is to be delegated to the locked print job in the locked printing field 1082. The information identifying the another user may be automatically entered by the client device 22. Further, the user may enter special instructions, for the another person, in field 1084.

As illustrated in FIG. 10D, the information identifying the another user may be an e-mail address of an executive assistant. However, it is noted that the e-mail address may specify any other person that is to be delegated to the locked print job. Further, other types of information may be used to identify the another user, for example a telephone number, network identifier, user ID, instant messaging identifier, look-up table identifier, or other identifier that may be used to communicate with the another user. Moreover, the information identifying the another user may be preset in the client device 10 or the printing device 22. When the information identifying the another user is preset in the printing device 22, the information identifying the another user may be replaced with information identifying the user delegating the locked print job.

The printing device 22 may include a user interface 24, print process 26, locked print process 28, web server 30, storage 32 storing print job data 34, and delegated locked print process 36. The user interface 24 may be any mechanism and/or medium that provides for the exchange of information between a user and the printing device 22. The print process 26 may be implemented by one or more processes for printing the print job received from the client device 10. The locked print process 28 is a process for processing a locked print job. The web server 30 may be implemented by any mechanism or process for generating Web pages, which allows an administrator to manage the printing device 20. For example, the administrator 20 may access the web server 30 to manage (e.g., edit, delete, or add) pending print jobs stored in the printing device 20, and/or to configure the manner in which the printing device 20 processes a delegated locked print request. The storage 32 is configured to store the print job data 34 received from the client device 10. Further, the delegated locked print process 36 determines whether the print job received from the client device 10 is to be delegated, and to forward information associated with the delegated print job to the another user, as further discussed below.

The assistance device 40 may include an application 42 configured to receive authentication information (e.g., password data) to unlock locked print job data stored in the printing device 22. The assistant device 40 may receive the authentication information from the client device 10 or the printing device 22. When the authentication information is sent by the printing device 22, it is noted that receipt of the print job by the printing device 22 can be confirmed. Alternatively, receipt can also be confirmed if the printing device 22 sends an acknowledgement to the client device 10, that the print job has been received, before the client device 10 sends the authentication information to the assistant device 40.

Figure 2:
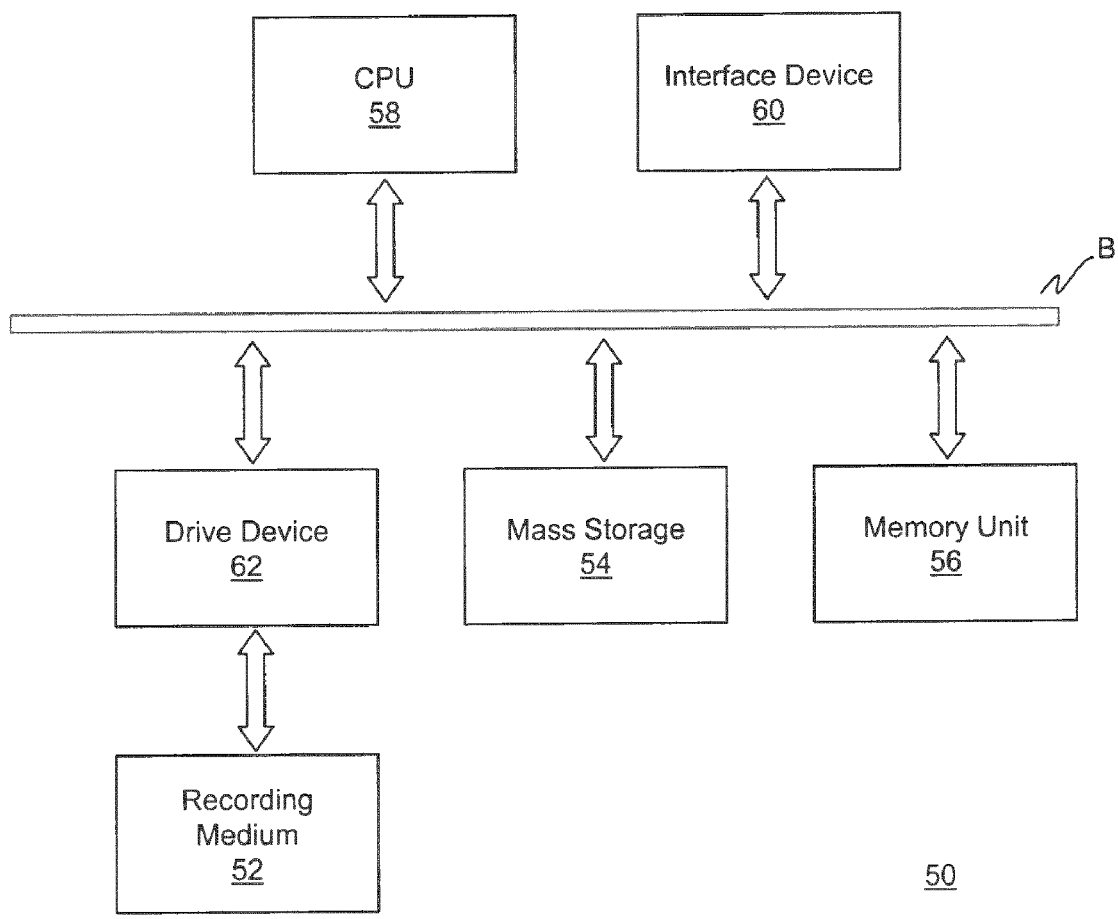
FIG. 2 illustrates hardware components of one embodiment of the client device and assistant device.

FIG. 2 illustrates a computer system 50 upon which embodiments of the client device 10 and assistant device 40 may be implemented. The client device 10 and assistant device 40 may be implemented in, for example, workstations, personal computers, laptop computers, personal digital assistants (PDAs), cellular telephone devices, or other mobile devices. The computer system 50 includes a bus B or other communication mechanism for communicating information such as address information and data, and a processor/CPU 58 coupled with the bus B for processing the information. The computer system 50 also includes a main memory/memory unit 56, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 58. In addition, the memory unit 56 may be used for storing temporary variables or other intermediate information during the execution of instructions by the CPU 58. The computer system 50 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 58.

The computer system 50 may also include a disk controller coupled to the bus B to control one or more storage devices for storing information and instructions, such as mass storage 54 which may be a hard disk drive, for example, and drive device 62 (e.g., floppy disk drive, read-only compact disc drive, read/write compact disc drive, compact disc jukebox, tape drive, flash memory or a flash memory based drive, and removable magneto-optical drive). The storage devices may be added to the computer system 50 using an appropriate device interface (e.g., small computer system interface (SCSI), integrated device electronics (IDE), enhanced-IDE (E-IDE), direct memory access (DMA), or ultra-DMA).

The computer system 50 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 50 may also include a display controller coupled to the bus B to control a display, such as a cathode ray tube (CRT), organic light emitting diode (OLED) display, or liquid crystal display (LCD), for displaying information to a computer user. The computer system may include input devices, such as a keyboard, pointing device, or touch display, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 50 performs a portion or all of the processing steps in response to the CPU 58 executing one or more sequences of one or more instructions contained in a memory, such as the memory unit 56. Such instructions may be read into the memory unit from another computer-readable medium, such as the mass storage 54 or a removable media 52. One or more processors in a multi-processing arrangement may also be employed to execute the sequences of instructions contained in memory unit 56. In alternative embodiments, hard-wired circuitry may be used in place of or in combination with software instructions. Thus, embodiments are not limited to any specific combination of hardware circuitry and software.

As stated above, the computer system 50 includes at least one computer-readable medium 52 or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other storage medium from which a computer can read.

Stored on any one or on a combination of computer-readable media is software for controlling the computer system 50, for driving a device or devices, and for enabling the computer system 50 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to, scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 58 for execution. A computer-readable medium may take many forms, including but not limited to, non-volatile media, and volatile media. Non-volatile media includes, for example, optical, magnetic disks, and magneto-optical disks, such as the mass storage 54 or the removable media 52. Volatile media includes dynamic memory, such as the memory unit 56.

Various forms of computer-readable media may be involved in carrying out one or more sequences of one or more instructions to the CPU 58 for execution. For example, the instructions may initially be carried on a magnetic disk of a remote computer. The remote computer can load the instructions remotely into a dynamic memory and send the instructions over a telephone line using a modem. A modem local to the computer system 50 may receive the data on the telephone line and use an infrared transmitter to convert the data to an infrared signal. An infrared detector coupled to the bus B can receive the data carried in the infrared signal and place the data on the bus B. The bus B carries the data to the memory unit 56, from which the CPU 58 retrieves and executes the instructions. The instructions received by the memory unit 56 may optionally be stored on mass storage 54 either before or after execution by the CPU 58.

The computer system 50 also includes a communication interface 60 coupled to the bus B. The communication interface 58 provides a two-way data communication coupling to a network that is connected to, for example, a local area network (LAN), or to another communications network such as the Internet. For example, the communication interface 60 may be a network interface card to attach to any packet switched LAN. As another example, the communication interface 60 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 60 sends and receives electrical, electromagnetic, or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 60, which carry the digital data to and from the computer system 50 may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 50 can transmit and receive data, including program code, through the network and the communication interface 60. Moreover, the network may provide a connection to a mobile device such as a personal digital assistant (PDA) laptop computer, or cellular telephone.

Alternatively, the client device 10 may be implemented in a digital copier/printer multi-function machine (MFP), as further discussed below. For example, the client device 10 may capture an image, which is transmitted to the printing device 22 for outputting. Further, the assistant device 40 may be incorporated in the printing device 22, in which case the delegated user may retrieve the authentication information directly from the printing device 22.

Figure 3A:
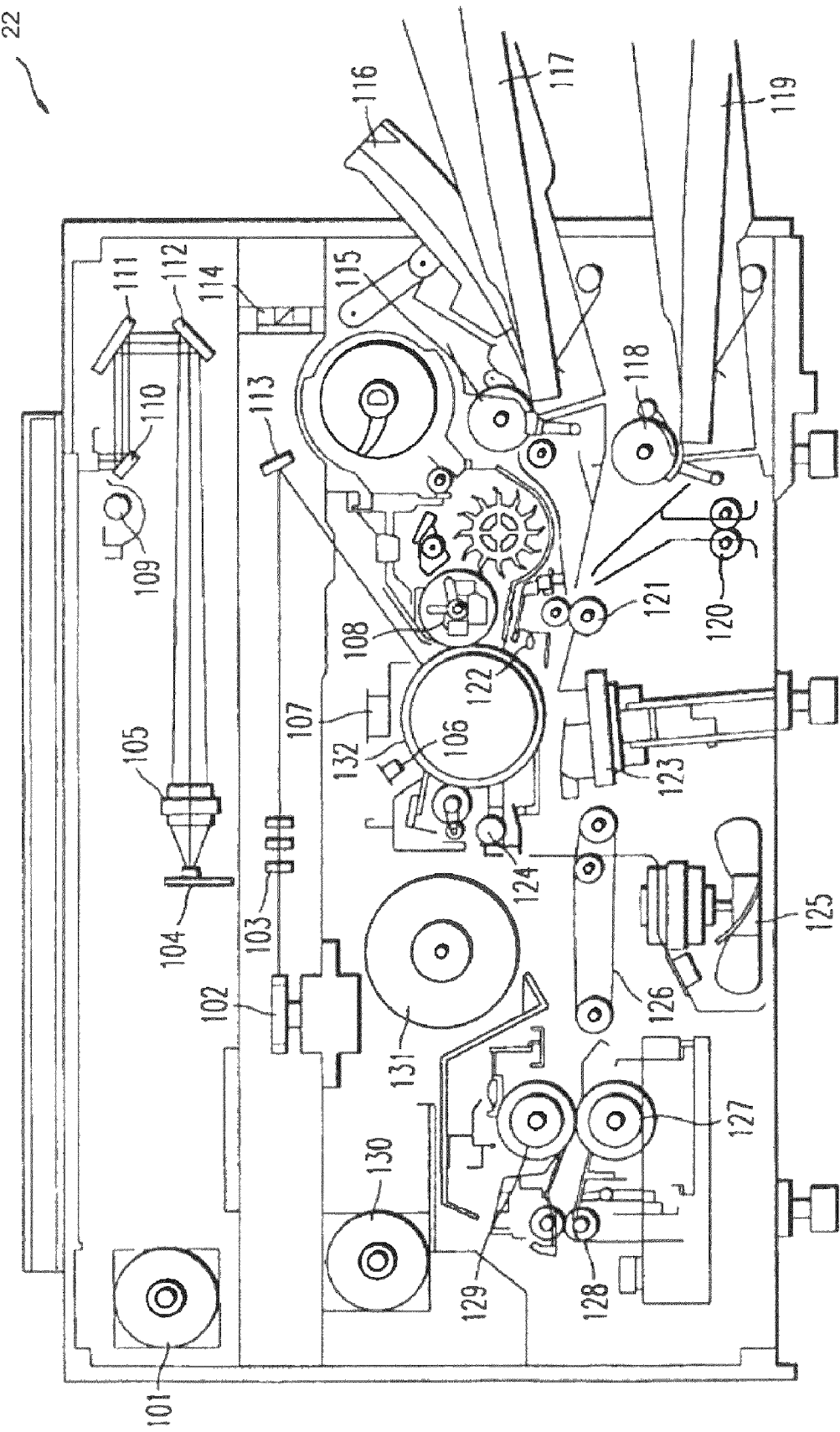
FIG. 3A illustrates hardware components of an exemplary printing device.

FIG. 3A illustrates an exemplary mechanical layout of the printing device 22 illustrated in FIG. 1, which may correspond to a digital copier/printer multi-function machine (MFP). In FIG. 3A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the MFP, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

Figure 3B:
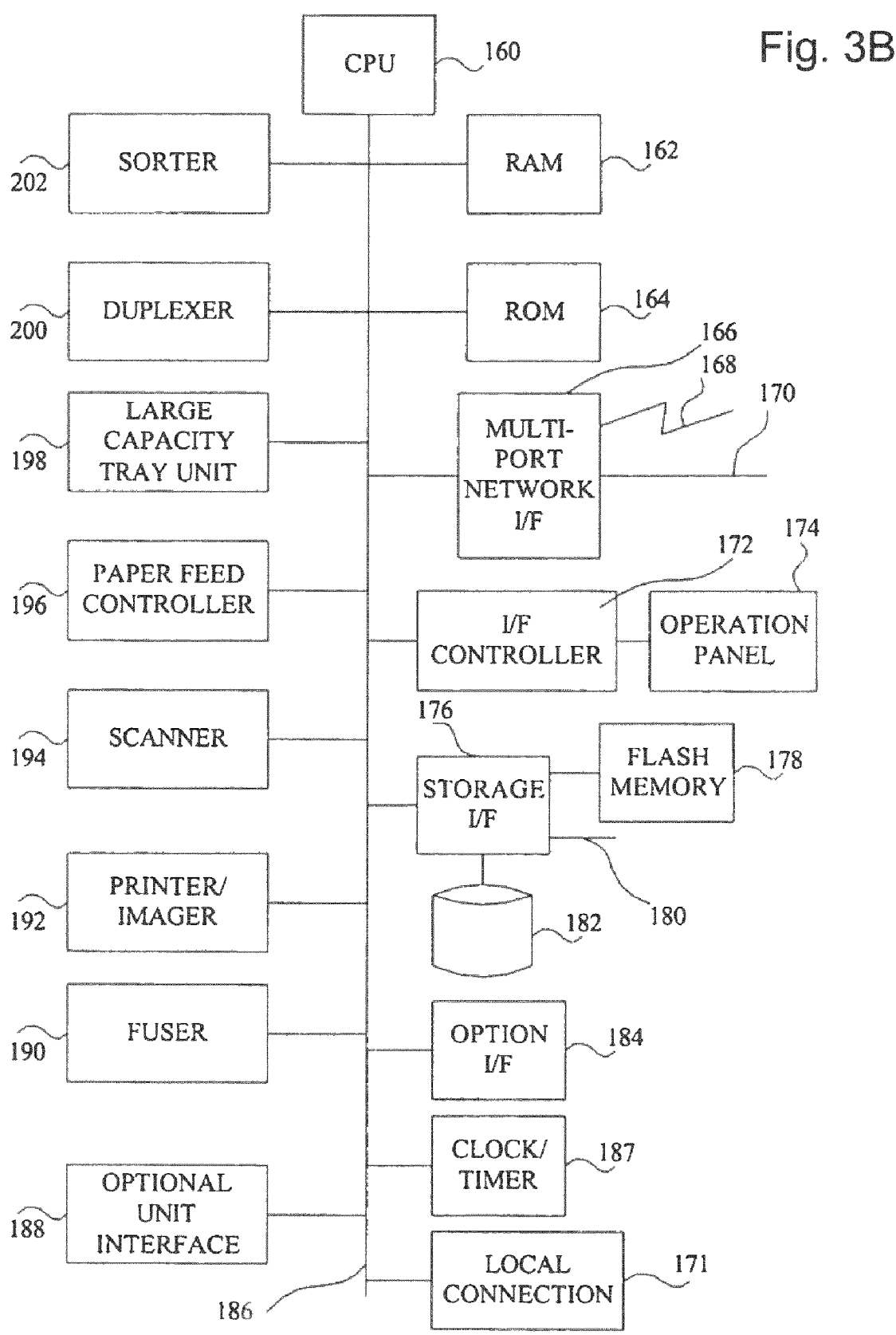
FIG. 3B illustrates electronic components of the printing device illustrated in FIG. 3A.

FIG. 3B illustrates a block diagram of the electronic components of the MFP 4 illustrated in FIG. 3A. The CPU 160 is a microprocessor and acts as the system controller. There is a random access memory (RAM) 162 to store dynamically changing information including operating parameters of the digital copiers. A read-only memory (ROM) 164 stores the program code used to run the MFP 4 and also information describing the static-state data such as model number, serial number, and default parameters that would not change over the life of the machine. When the device needs to boot up from either a hard disk or flash memory, the ROM memory 164 stores the boot sequence.

Similar to the computer system 50 discussed above, the MFP 4 may perform a portion or all processing steps in response to the CPU 160 executing one or more sequences of one or more instructions contained in a memory, such as the ROM 164 or of one of the memory types discussed above with respect to the computer system 50. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the MFP 4 to communicate with external devices. Reference numeral 168 represents a telephone or other communication line including a wireless channel. Further information of the multi-port communication interface is described with respect to FIG. 3C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display may be included within the operation panel 174 to display parameters and messages of the apparatus. The operation panel also can be a touch panel in which the display and function buttons may change according to the context.

A local connection interface 171 is a connection through local port such as RS232, USB and IEEE 1394. This interface 171 allows external devices to be attached to the apparatus.

A storage interface 176 connects storage devices to the system bus 186. The storage devise include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 3B, the various sections making up the MFP 4 are illustrated. Reference numeral 202 designates a sorter and contains sensors and actuators used to sort the output of the digital copier/printer multi-function machine. There is a duplex 200 that allows a duplex operation to be performed and includes conventional sensors and actuators. The MFP 4 includes a large capacity tray unit 198 that allows paper trays holding a large number of sheets to be used. The large capacity tray unit 198 includes conventional sensors and actuators.

A paper feed controller 196 is used to control the operation of feeding paper into and through the MFP 4. A scanner 194 is used to scan images into the MFP 4 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the MFP 4 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the MFP 4.

Figure 3C:
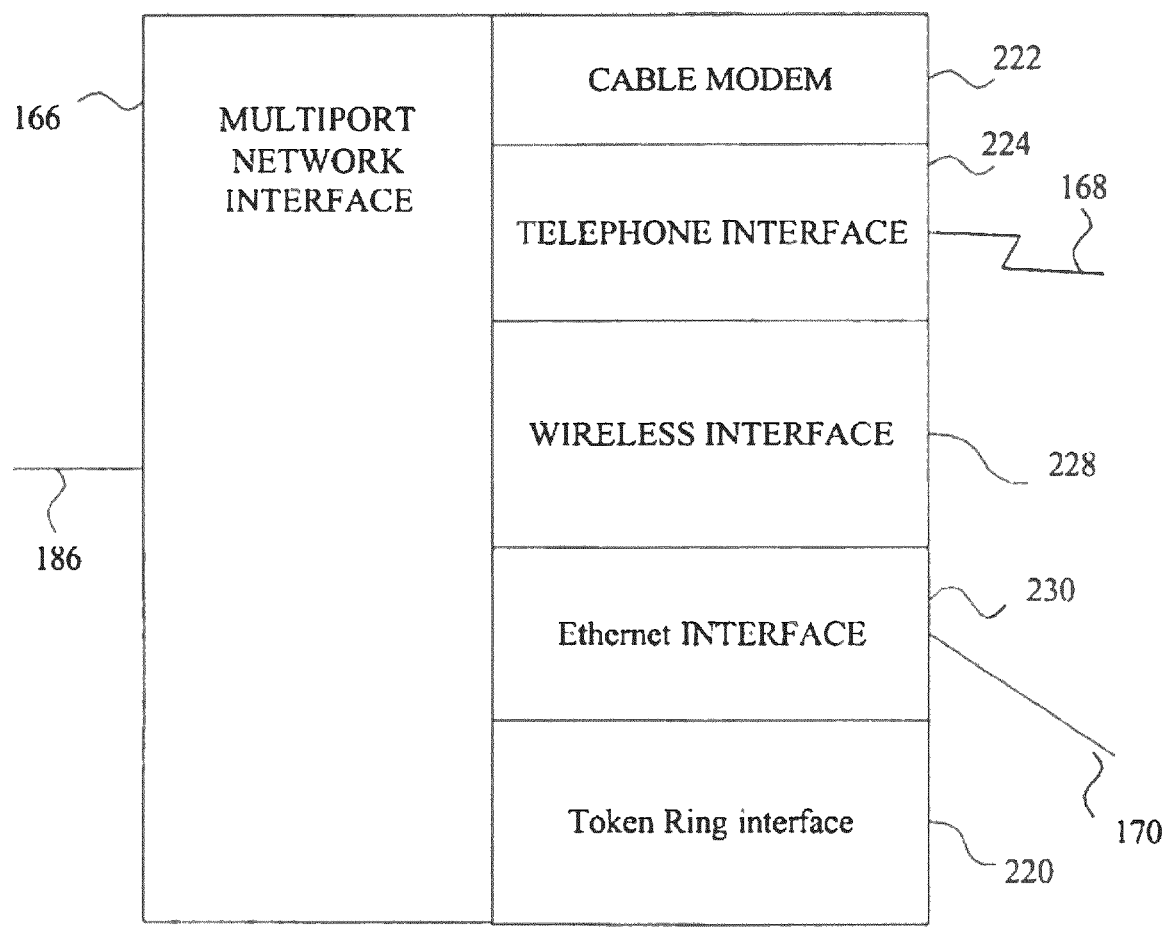
FIG. 3C illustrates details of the multi-port communication interface illustrated in FIG. 3B.

FIG. 3C illustrates details of the multi-port network interface 166. The MFP 4 may communicate to external devices through a Token Rink interface 220, a cable modem unit 222 that has a high speed connection over cable, a conventional telephone interface 224 that connects to a telephone line 168, wireless interface 228, and an Ethernet interface 230. Other interfaces (not shown) include, but are not limited to, a Digital Subscriber line. The multi-port network interface does not need to have all the interfaces described in FIG. 3C.

The CPU or other microprocessor or circuitry executes a monitoring process to monitor the state of each of the sensors of the MFP 4, and a sequencing process is used to execute the instructions of the code used to control and operate the MFP 4. Additionally, there is (1) a central system control process executed to control the overall operation of the MFP 4 and (2) a communication process used to assure reliable communication to external devices connected to the MFP 4. The system control process monitors and controls data storage in a static state (e.g., the ROM 164 of FIG. 3B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to store data for future processing.

Figure 3D:
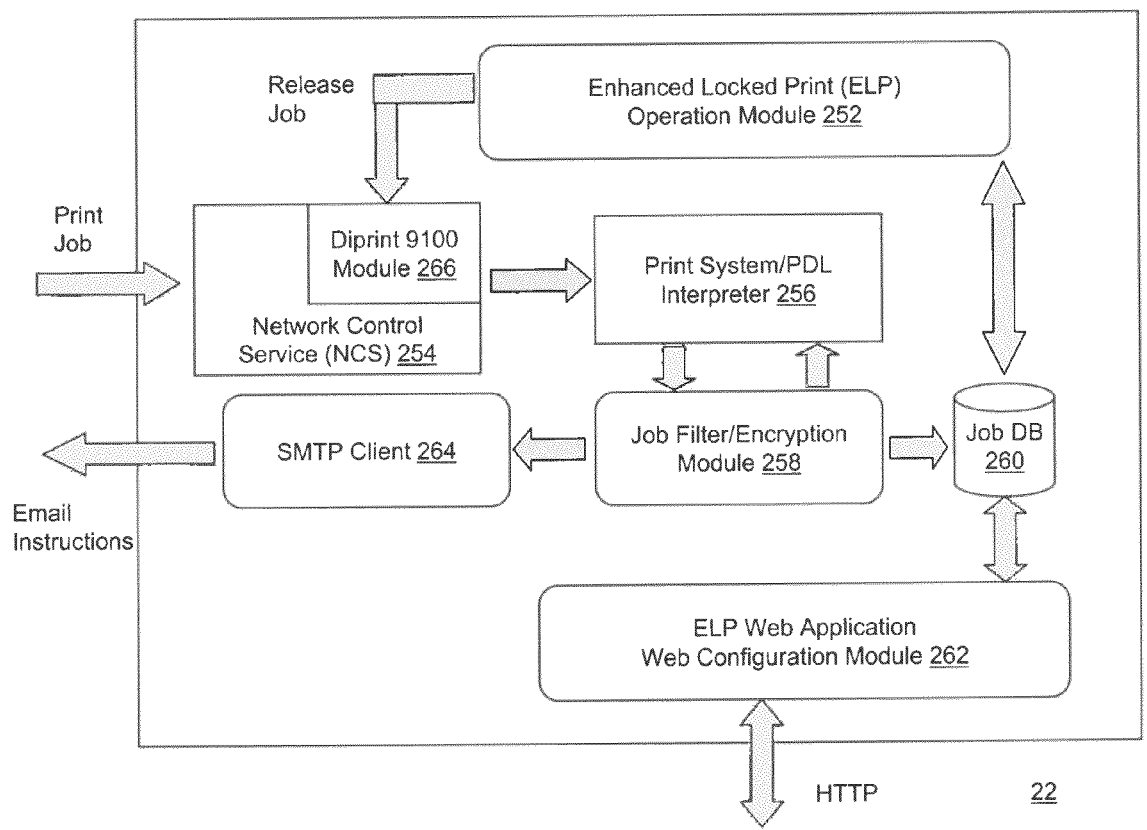
FIG. 3D illustrates an exemplary software application for the printing device.

FIG. 3D illustrates a flow diagram between electronic components in an exemplary embodiment of the printing device 22. As illustrated in FIG. 3D, a network control service (NCS) 254 receives a print job from the printer driver 14 of the client device 10, which is connected to a TCP port of the printing device 22. The print job includes authentication information generated by the printer driver that is sent as encrypted data to the printing device 22. The NCS 254 includes Diprint 9100 module 266, which monitors port 9100 for TCP print jobs from the client device 10, and controls communications over the network. After receiving the print job, the NCS 254 transfers the print job to print system 256, which forwards the print job to the job filter/encryption module 258.

The job filter/encryption module 258 determines whether the print job has been delegated to another user. If the print job has been delegated, the job filter/encryption module 258 extracts e-mail information from the print job and sends the extracted e-mail information to a Simple Mail Transfer Protocol (SMTP) Client 264, which e-mails the authentication information based on the extracted e-mail information. Further, the job filter/encryption module 258 determines if the print job has been locked. If the print job has been locked, the job filter/encryption module 258 stores the print job in job DB 260. The job filter/encryption module 258 may encrypt the print job prior to storing the print job in the job DB 260. If the job filter/encryption module 258 determines that the print job has not been delegated to another user and locked, the job filter/encryption module 258 returns the print job to the print system 256, which interprets print data, e.g., a printer description language (PDL) data included in the print job, and prints the print data associated with the print job.

Figure 12A:
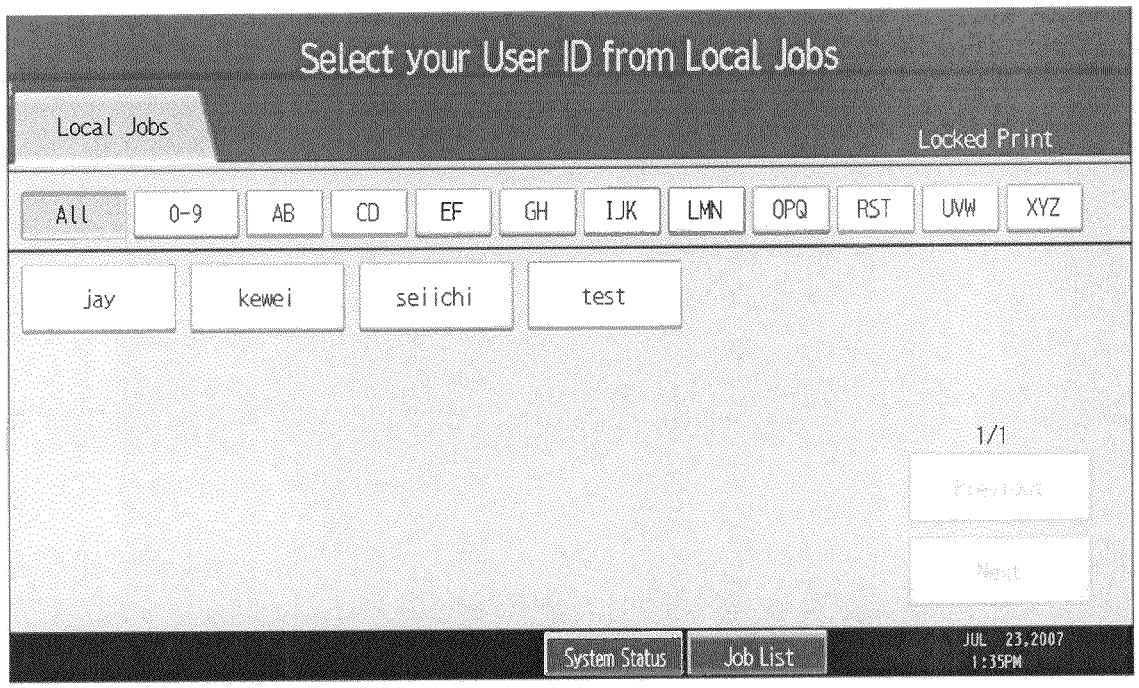
Figure 12B:
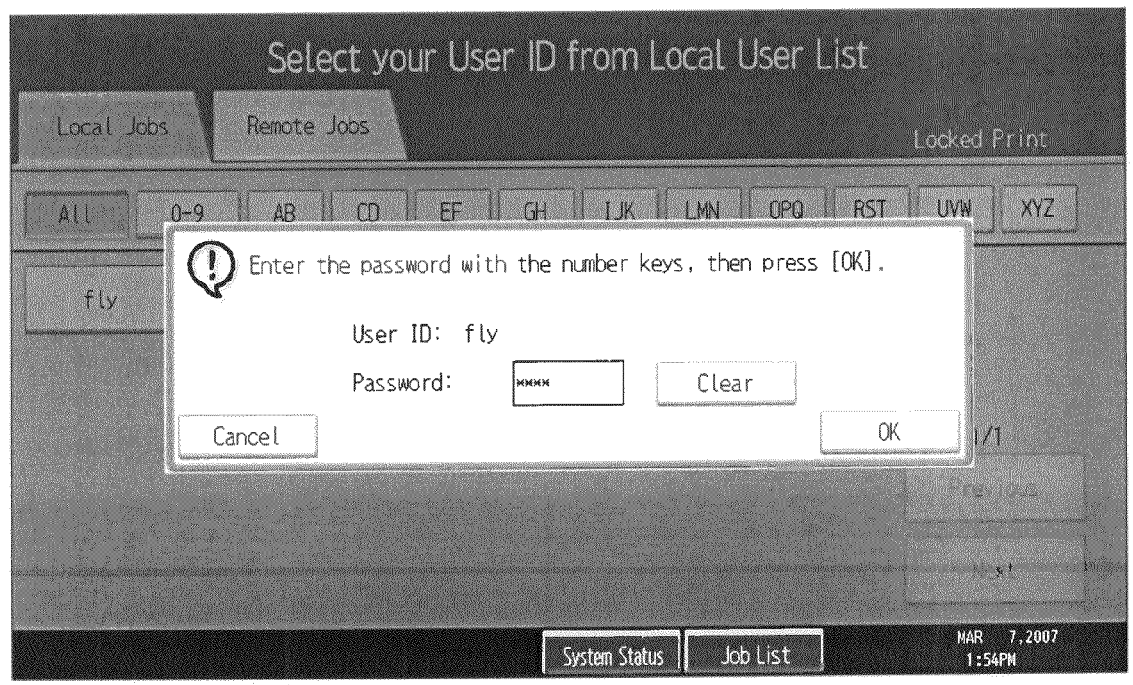
Figure 12C:
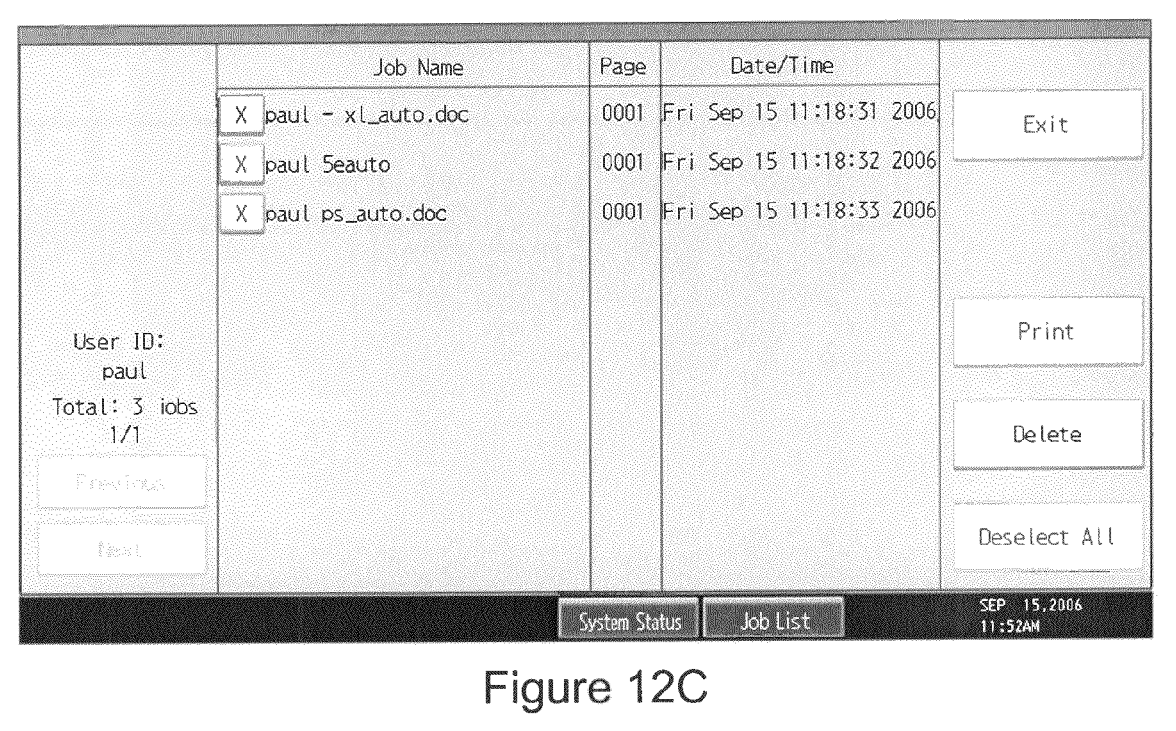
Figure 13:
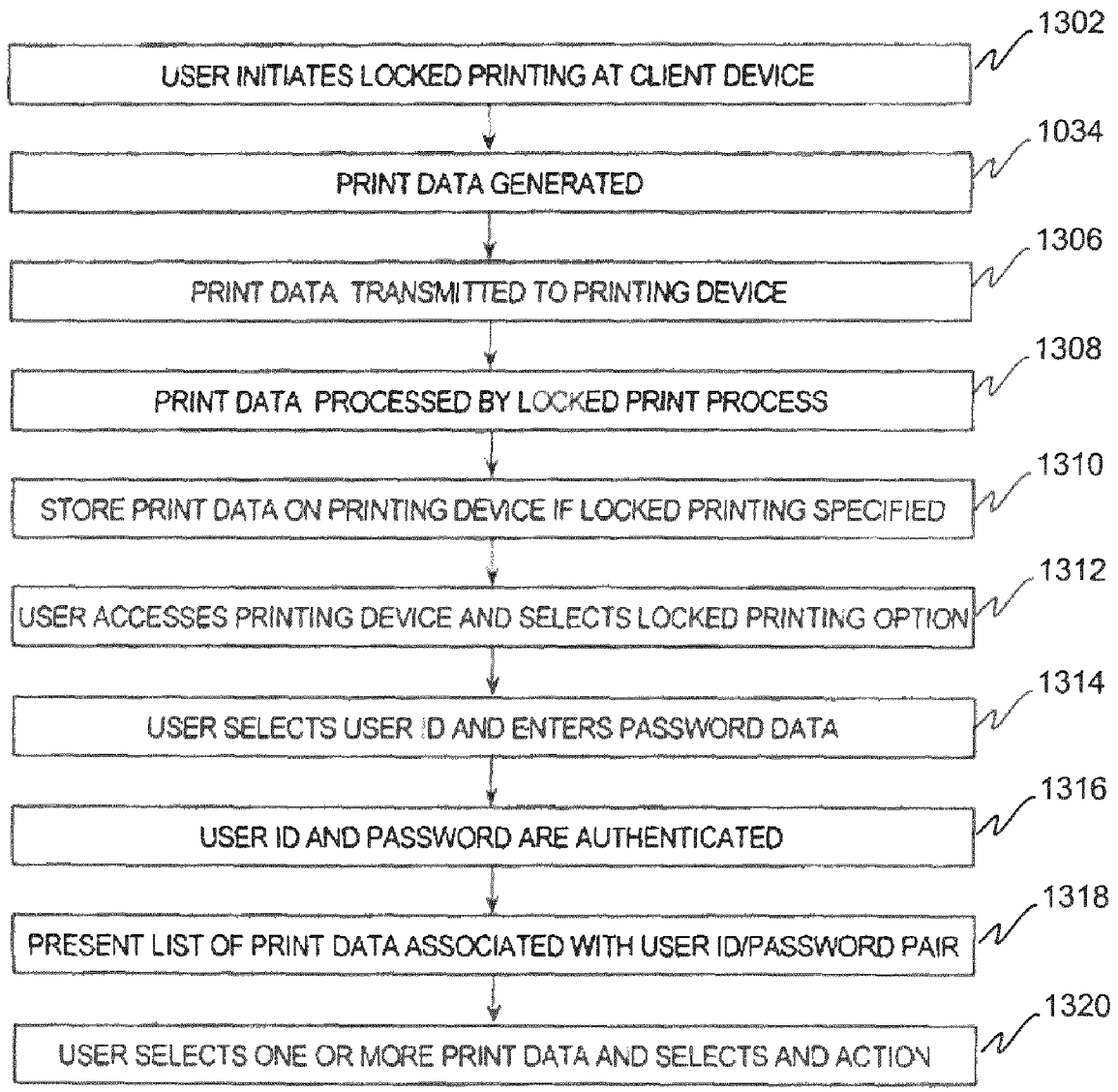
FIG. 13 illustrates a flow diagram for a locked print process.

Enhanced locked print (ELP) operation module 252 is configured to provide an interface for a user to access locked print jobs stored in the printing device 22. When a user operates the ELP operation module 252, the user enters a user ID and corresponding authentication information. FIG. 12A illustrates an exemplary interface for the user to select the user ID, and FIG. 12B illustrates an exemplary interface for the user to enter the corresponding authentication information. After the user ID and authentication information are inputted by the user, the ELP operation module 252 retrieves print jobs associated with the user ID from the job DB 260. The retrieved print jobs are displayed to the user, for example, as illustrated in FIG. 12C. After a particular print job is selected by the user, the ELP operation module pulls the selected print job from the job DB 260 and sends the print job to the Diprint 9100 module 266. The Diprint 9100 module 266 forwards the print job to the printer system 256, which prints the print data associated with the print job. When, the print system 256 is aware that the print job is unlocked, the print job is printed without forwarding to the job filter/encryption module 258.

Further, the printing device 22 may include an ELP web application web configuration module 262, which connects to an administrator application using the hypertext transfer protocol (HTTP) or. However, the administrator application may connect to the ELP web application web configuration module 262 using other communication protocols such as the file transfer protocol (FTP). The administrator application may connect to the ELP web application web configuration module 262 to manage the print jobs stored on the printing device 22.

Figure 4:
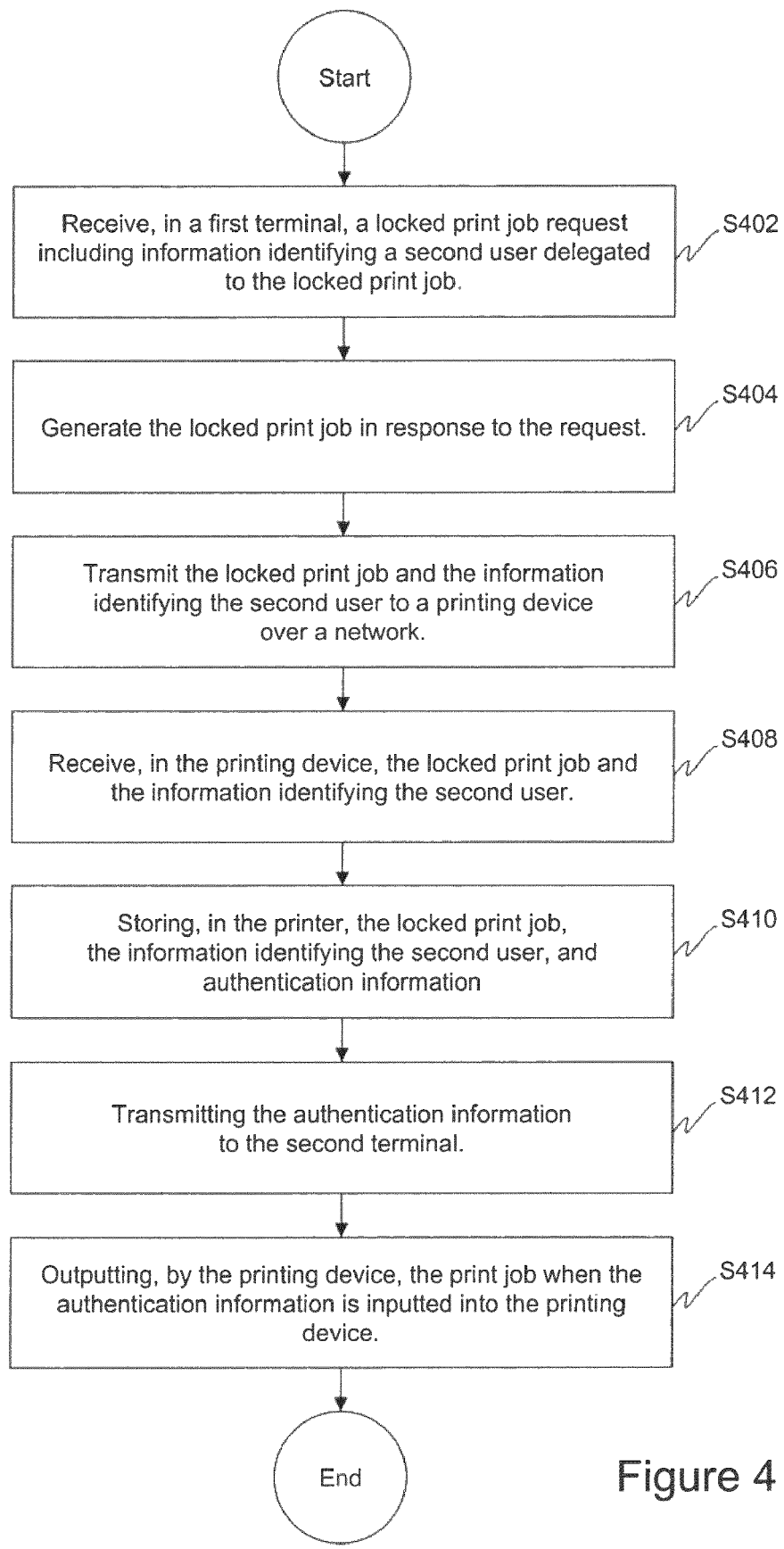
FIG. 4 illustrates a flow diagram of a delegated locked printing process according to one embodiment.

FIG. 4 provides an overview of a process for delegating a print job, initiated by a first user, to a second user. In step S402, a first terminal (e.g., the client device 10), associated with the first user, receives a locked print job request including information identifying a second user delegated to the locked print job. A locked print job is generated in response to the locked print job request, in step S404. Further, the locked print job and the information identifying the second user is transmitted to the printing device 22 connected to the first terminal over the network, in step S406. In step S408, the printing device 22 receives the locked print job and the information identifying the second user. The printing device 22 stores the locked print job, the information identifying the second user, and authentication information, in step S410. The authentication information may be generated by the printing device 22, or generated and transmitted to the printing device 22 by the first terminal. In step S412, the authentication information is transmitted to the second terminal (e.g., the assistant device 40). The authentication information may be transmitted to the second terminal by either the first terminal or printing device 22. After step S412, the printing device 22 outputs the print job when the authentication information is inputted into the printing device, in step S414. The outputting of the print job may include any of printing, forwarding to another device, or faxing. In one embodiment, the inputting of the authentication information may simply allow the second user to access the print job stored in the printing device 22. The second user may then select an appropriate process to be performed on the print job.

Figure 5:
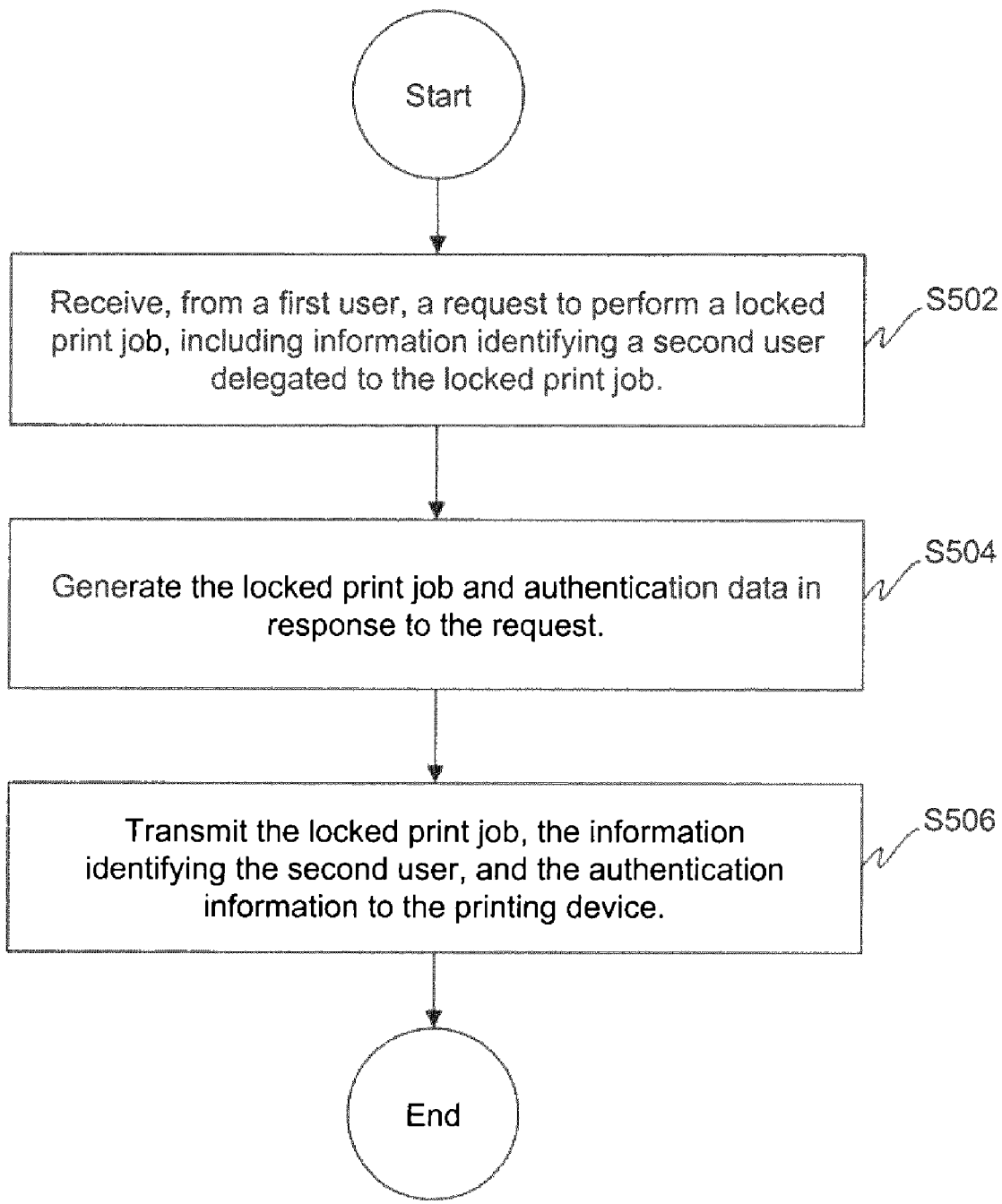
FIG. 5 illustrates a flow diagram of one embodiment for initiating a delegated locked print job by the client device.

FIG. 5 illustrates a process performed by the client device 10 to request a delegated locked print job. In step S502, the client device 10 receives a request to perform a locked print job from the first user. The request includes information identifying a second user delegated to the locked print job. The client device 10 generates the locked print job and authentication information in response to the request from the first user, in step S504. Further, in step S506, the client device 10 transmits the locked print job, the information identifying the second user, and the authentication information to the print device 22. However, as noted above, the authentication information is not required to be generated by the client device 10. Rather, the authentication information may be generated by the printing device 22 in response to receipt of the locked print job from the client device 10.

Figure 6:
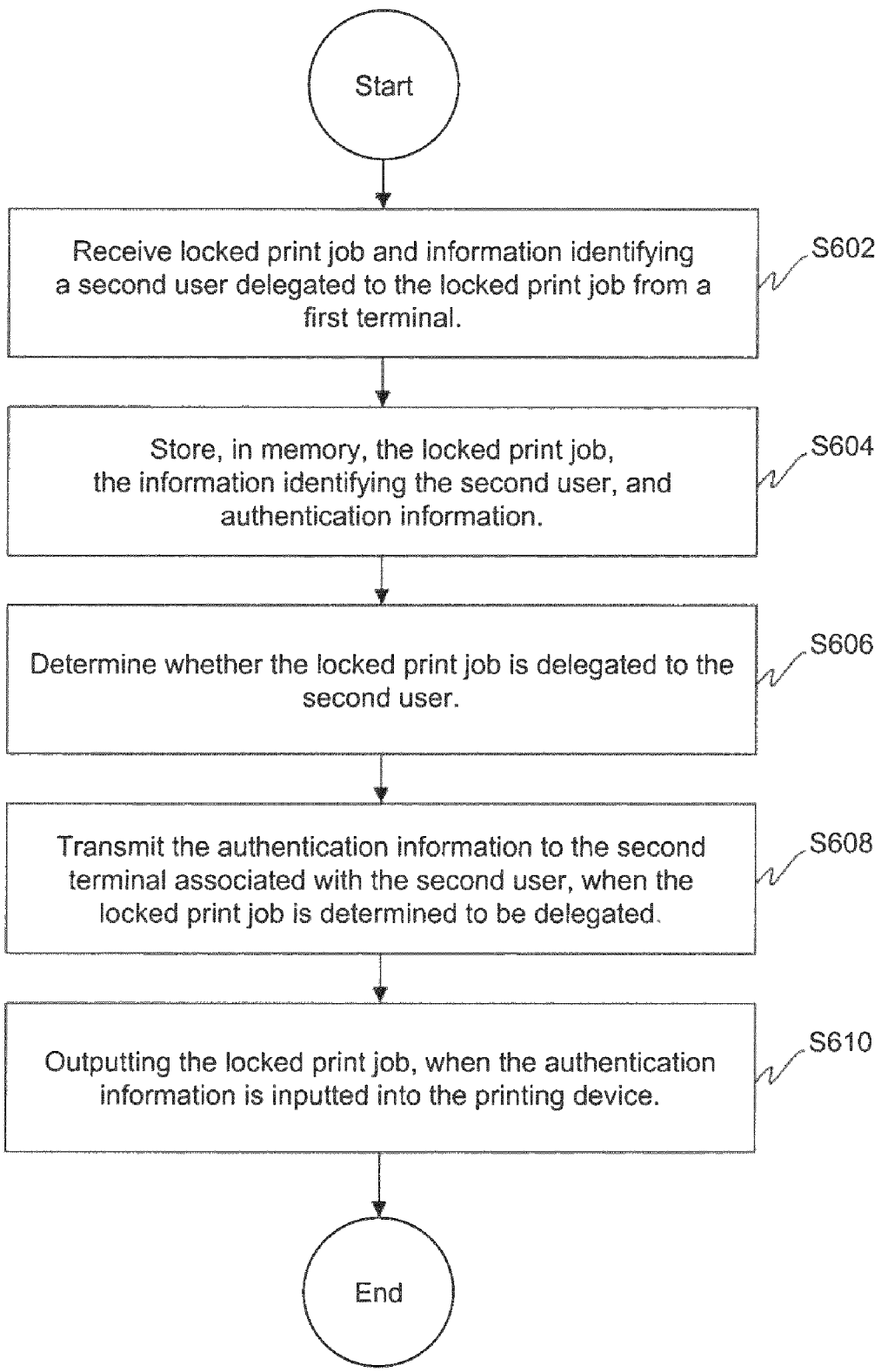
FIG. 6 illustrates a flow diagram of one embodiment for performing a delegated locked print job in the printing device.

FIG. 6 illustrates an exemplary process performed by the printing device 22. As illustrated in FIG. 6, the printing device 22 receives the locked print job and information identifying the second user delegated to the locked print job from the first terminal, in step S602. In step S604, the printing device 22 stores the locked print job, the information identifying the second user, and authentication information in a memory. Next, the printing device 22 determines whether the locked print job has been delegated to the second user, in step S606. If the locked print job is determined to be delegated to the second user, the printing device 22 transmits the authentication information to the second terminal associated with the second user, in step S608. However, as noted above, in an alternate embodiment, the authentication information may be transmitted to the second terminal directly from the first terminal. In step S610, the printing device 22 outputs the locked print job, when the authentication information is inputted into the printing device 22.

Figure 7:
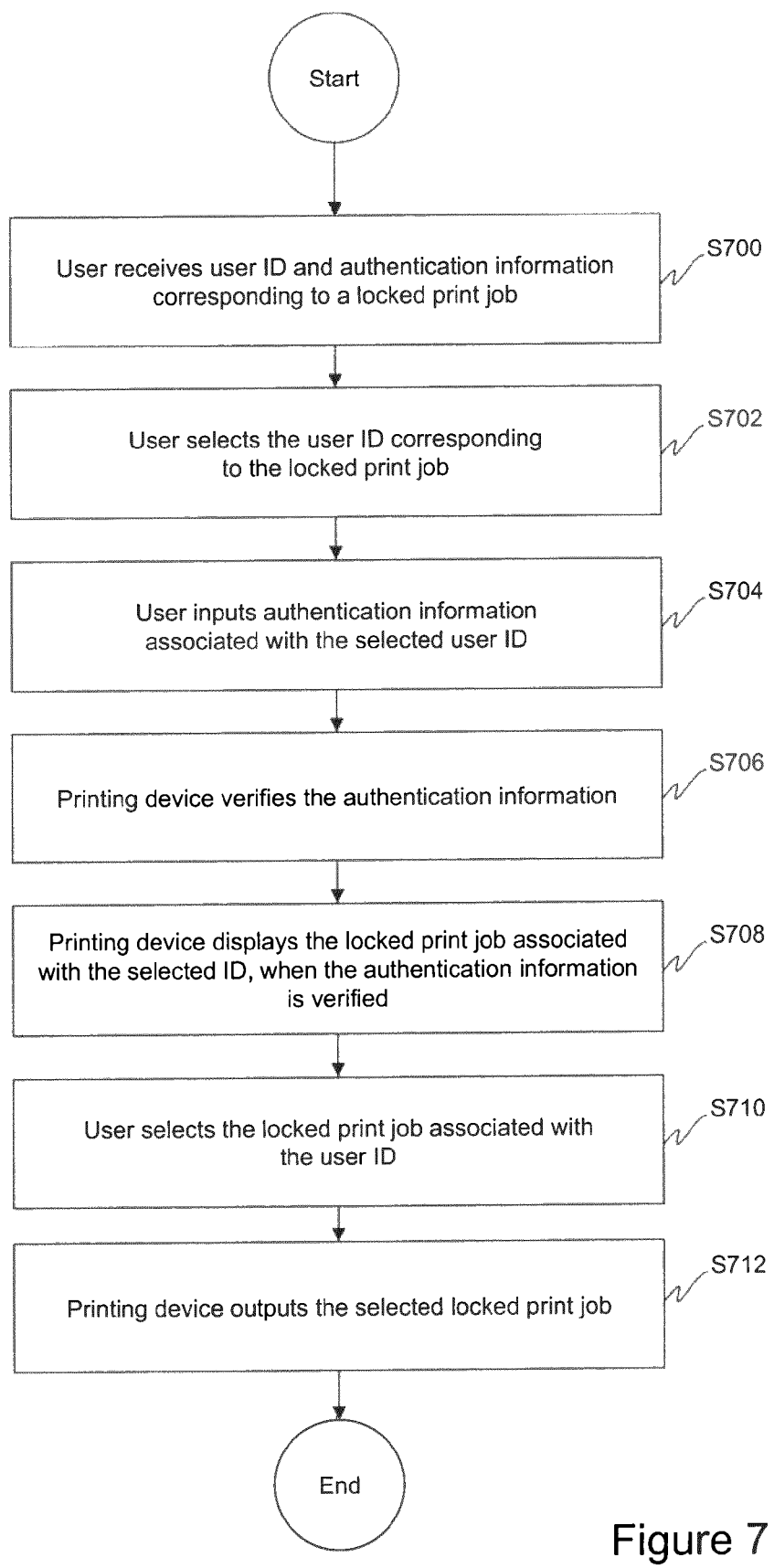
FIG. 7 illustrates a flow diagram of one embodiment for unlocking a locked print job stored in the printing device.

FIG. 7 illustrates a process for unlocking a locked print job stored in the printing device 22. In step S702, the second user selects a user ID corresponding to a locked print job. The user inputs the authentication information associated with the selected user ID in step S704. As discussed above, the user ID and/or authentication information are sent to the second user by the client device 10 or printing device 22. In step S706, the printing device 22 verifies the authentication information. The printing device 22 may verify the authentication information by comparing the user ID and authentication information to user IDs and authentication information stored in the printing device 22. When the user ID and authentication information is validated, the printing device 22 displays one or more locked print jobs associated with the user ID, in step S708. In step S710, the user selects a displayed locked print job associated with the user ID, and the printing device outputs the selected locked print job in step S712.

Figure 8:
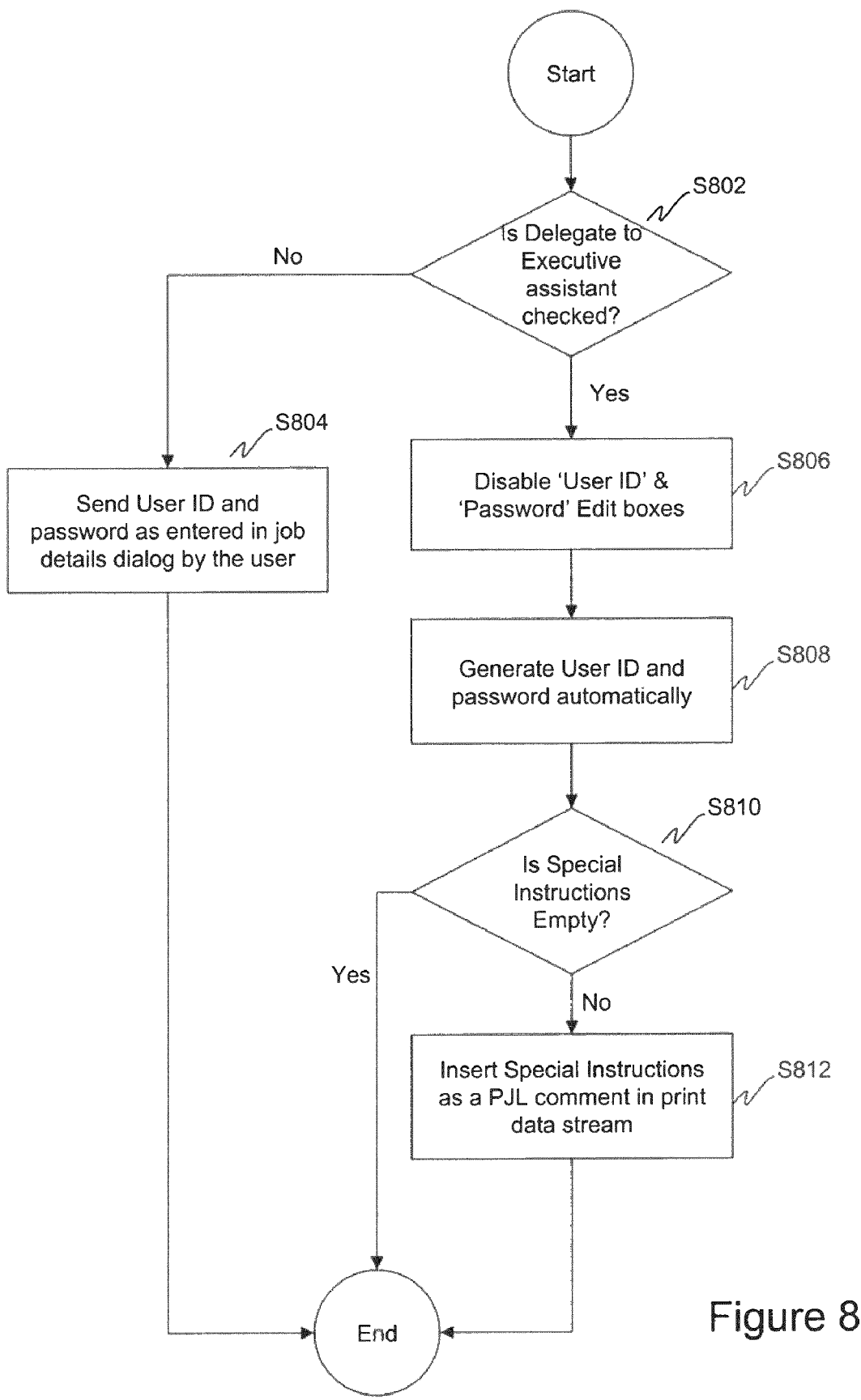
FIG. 8 illustrates a flow diagram for generating a unlocked/locked print job request by the client device.

FIG. 8 illustrates a process for generating the locked print job and authentication information, as illustrated in step S504 of FIG. 5. As illustrated in FIG. 8, the client device 10 determines whether a user has checked the "Delegate to Executive Assistant" option for a print job request, in step S802. If the "Delegate to Executive Assistant" option is not selected, the client device 10 transmits a user ID and password, in step S804. In one embodiment, the user ID and password may be entered by a user using the interface illustrated in FIG. 10C. However, if the delegate to executive assistant option is determined to be checked by the user, in step S808, the client device 10 disables the user ID and password edit boxes, for example, as illustrated in FIG. 10C, and generates the user ID and password automatically. Further, in step S810, the client device 10 determines whether special instructions have been entered by the user, such as in the special instructions field 1084 illustrated in FIG. 10D. If special instructions have not been entered, the process in FIG. 8 is ended. However, if special instructions were entered by the user, the client device 10 inserts the special instructions as a PJL comment in a print data stream to be transmitted to the printing device 22, in step S812.

Figure 9:
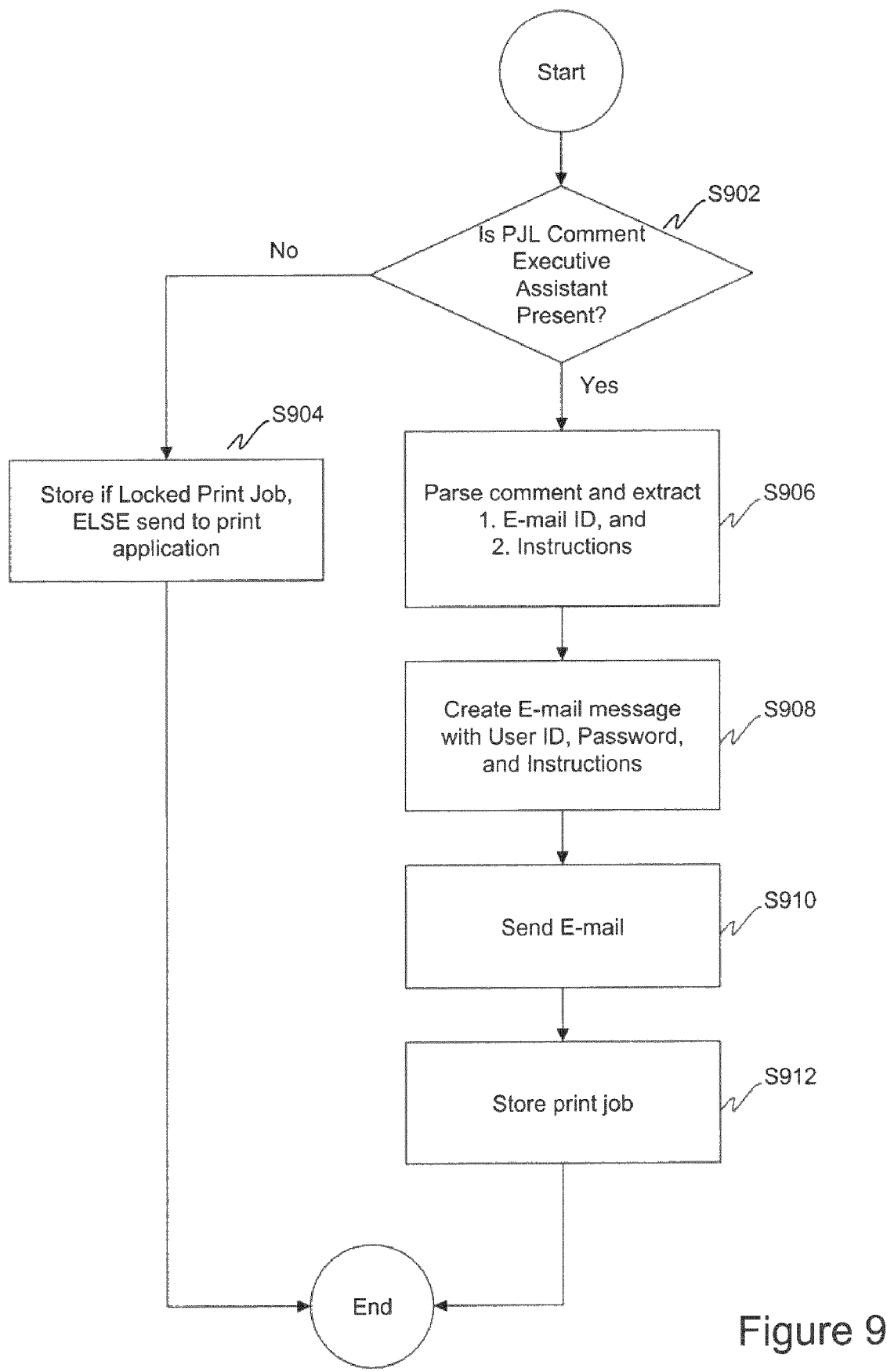
FIG. 9 illustrates a flow diagram for processing the unlocked/locked print job request in the printing device.

FIG. 9 illustrates an embodiment for processing a print job received by the printing device 22. The print job may include PJL commands/comments that are generated by the printer driver 14 of the client device 10. An exemplary set of PJL commands/comments generated by the printer driver 14, when the "Delegate to Executive Assistant" option is checked is illustrated in FIG. 11. As illustrated in FIG. 9, the printing device 22 determines if the PJL comment "Executive Assistant" is present in the print job received by the printing device 22, in step S902. If the PJL comment is not present, the printing device 22 stores the print job, if the print job is of the locked printing type, or sends the print job to a print application to printed, if the print job is not of the locked printing type. However, when the PJL comment "Executive Assistant" is determined to be present, the printing device 22 parses the PJL comments and extracts an e-mail ID and instructions, in step S906. The printing device 22 creates and e-mail message with the user ID, password, and instructions in step S608. The printing device 22 sends the message to the extracted e-mail in step S910, and stores the print job in S912. However, it is noted that the print job need not be stored after parsing the comment in step S906 and creating and sending the email message in steps S908 and S910. Rather, in other embodiments, the print job may be stored before, or at the same time, the comment is parsed, or the e-mail is created and sent.

Numerous modifications and variations of the present invention are possible in light of the above teachings. It is therefore to be understood that within the scope of the appended claims, the invention may be practiced otherwise than as specifically described herein.

The invention claimed is:

1. A method for outputting a locked print job by a printing device connected to a first terminal and a second terminal over a network, the method comprising:
    receiving, in the first terminal, a request to perform the locked print job from a first user, the request including information identifying a second user delegated to the locked print job;
    generating, by the first terminal, the locked print job in response to the request, the locked print job including one or more print job language (PJL) commands or comments identifying the locked print job as being delegated;
    transmitting, by the first terminal, the locked print job and the information identifying the second user to the printing device over the network;
    receiving, in the printing device, the locked print job and the information identifying the second user transmitted by the first terminal;
    determining whether the locked print job is delegated to the second user based on whether the locked print job includes one or a more predetermined printer job language (PJL) commands or comments;
    when the locked print job is determined to be delegated to the second user in the determining,
        storing, in the printing device, the locked print job, the information identifying the second user, and authentication information, the authentication information being configured to unlock the locked print job when entered into the printing device, and
        transmitting the authentication information to the second terminal associated with the second user; and outputting, by the printing device, the locked print job, when the authentication information is entered into the printing device.

2. The method according to claim 1, wherein the transmitting the authentication information comprises transmitting, by the printing device, the authentication information to the second terminal associated with the second user.

3. The method according to claim 1, wherein
the generating, in the first terminal, comprises generating the locked print job and the authentication information in response to the request;
the transmitting, by the first terminal, the locked print job comprises transmitting the locked print job, the information identifying the second user, and the authentication information to the printing device; and
the receiving, in the printing device, comprises receiving the locked print job, the information identifying the second user, and the authentication information transmitted by the first terminal.

4. The method according to claim 1, wherein the transmitting the authentication information comprises transmitting the authentication information in an e-mail message, based on the information identifying the second user.

5. The method according to claim 1, wherein the generating comprises automatically generating the authentication information in the first terminal.

6. The method according to claim 1, wherein the transmitting the authentication information comprises transmitting, by the printing device, the authentication information to the second terminal associated with the second user based on a destination extracted from a PJL comment included in the locked print job.

7. The method according to claim 1, wherein the generating the locked print job comprises generating the locked print job including a predetermined PJL comment that identifies the locked print job as being delegated.

8. A method for a printing device to service a request to perform a locked print job from a first user, comprising:
receiving the locked print job and information identifying a second user delegated to the locked print job from a first terminal;
determining whether the locked print job is delegated to the second user based on whether the locked print job includes one or more predetermined printer job language (PJL) commands or comments;
when the locked print job is determined to be delegated to the second user in the determining,
transmitting authentication information to a second terminal associated with the second user, and
storing, in a memory, the locked print job, the information identifying the second user, and the authentication information, the authentication information being configured to unlock the locked print job when entered into the printing device; and
outputting the locked print job, when the authentication information is inputted into the printing device.

9. The method according to claim 8, wherein the transmitting the authentication information comprises transmitting the authentication information in an e-mail message, based on the information identifying the second user.

10. The method according to claim 8, wherein the receiving comprises receiving the authentication information that is automatically generated by the first terminal.

11. A printing device, comprising:
means for receiving the locked print job and information identifying a second user delegated to the locked print job from a first terminal;
means for determining whether the locked print job is delegated to the second user based on whether the locked print job includes one or a more predetermined printer job language (PJL) commands or comments; and
means for transmitting authentication information to a second terminal associated with the second user, when the locked print job is determined to be delegated to the second user by the means for determining;
means for storing, in a memory, the locked print job, the information identifying the second user, and the authentication information, the authentication information being configured to unlock the locked print job when entered into the printing device; and
means for outputting the locked print job, when the authentication information is inputted into the printing device.

12. The printing device according to claim 11, wherein the means for transmitting transmits the authentication information in an e-mail message, based on the information identifying the second user.

13. The printing device according to claim 11, wherein the means for receiving receives the authentication information that is automatically generated by the first terminal.

* * * * *